2,957,006
NEW SALTS OF BASIC ETHERS OF DIPHENYL ETHINYL CARBINOLS AND THE PRODUCTION THEREOF

Herbert Arnold, Bielefeld, Engelbert Kühas, Gadderbaum, and Norbert Brock, Wadersloh, Germany, assignors to Asta-Werke Aktiengesellschaft, Chemische Fabrik, Brackwede, Germany No Drawing. Filed Feb. 25, 1957, Ser. No. 641,802

7 Claims. (Cl. 260—326.5)

The present invention relates to new salts of basic ethers of diphenyl ethinyl carbinols and the production thereof.

It is known that the salts of basic ethers of diphenyl carbinols of the general formula

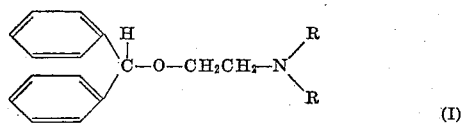

wherein the phenyl radicals may be substituted and R is an alkyl radical, and particularly the product of the formula

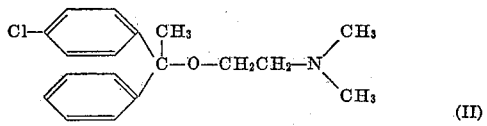

show an antihistaminic effect and consequently are used inter alia for the treatment of allergic illnesses.

It has now been found that the introduction of an ethinyl group at the α-carbon atom results in a considerable strengthening of the anticholinergic activity of the compounds in question. This discovery, initially shown from treatment of an isolated guinea pig intestine, has in principle been similarly confirmed in connection with experiments on the complete animal. In addition, a strong nicotinolytic activity is also apparent in these compounds, which activity cannot be detected in compounds of the Formulae I and II.

The new products obtainable in accordance with the invention are the salts of the basic ethers corresponding to the general formula

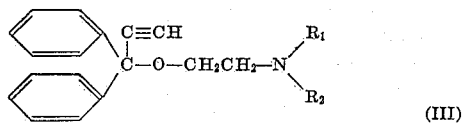

wherein $R_1$ and $R_2$ are alkyl radicals with 1–3 carbon atoms and the phenyl nuclei may be substituted by substituents of the group consisting of the halogen atoms and the methyl radical.

The present invention is particularly concerned with the production of the salts of the basic ethers of the general formula

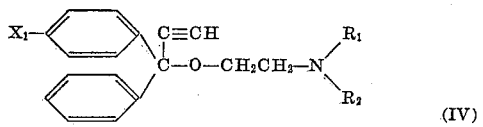

wherein $X_1$ is a substituent of the group consisting of hydrogen and the halogen atoms and $R_1$ and $R_2$ are alkyl radicals with 1–3 carbon atoms.

The evolution of this specific anticholinergic activity gives these compounds an importance beyond the scope of antihistaminics for certain clinical indications for which normally atropine is necessary. However, the results of experiments carried out on animals give reason for believing that the known disadvantages of atropine i.e. disadvantageous effects on the system, are avoided with the newly developed compounds of the invention.

The following table shows the results of experiments carried out with α-ethinyl-substituted benzhydryl ethers on the isolated intestine of a guinea pig. In this table, the rise in the anticholinergic effect is illustrated by the activity indices. The activity index is a measure of how many times the efficacy ($DE_{50}$ value) is greater than that of diphenyl hydramine (=1). It will be seen that the ethinylation in the α-position of the basic molecule in the compounds III and IV causes an increase of up to half the effect of atropine (33.0%).

The compounds which are set out in the following table correspond to the following general formula

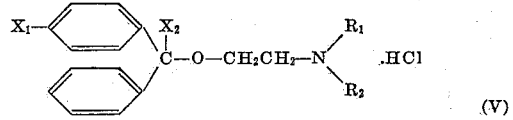

the substituents $X_1$, $X_2$, $R_1$ and $R_2$ being separately indicated in the table.

TABLE

| | $X_1$ | $X_2$ | $R_1$ | $R_2$ | Activity index |
|---|---|---|---|---|---|
| I | H | H | $CH_3$ | $CH_3$ | 1 |
| II | Cl | $CH_3$ | $CH_3$ | $CH_3$ | 1 |
| III | H | $C{\equiv}CH$ | $CH_3$ | $CH_3$ | 8 |
| IV | Cl | $C{\equiv}CH$ | $CH_3$ | $CH_3$ | 5.3 |
| V | Cl | $C{\equiv}CH$ | $C_2H_5$ | $C_2H_5$ | 13.9 |
| VI | Br | $C{\equiv}CH$ | $C_2H_5$ | $C_2H_5$ | 3.0 |
| VII | F | $C{\equiv}CH$ | $CH_3$ | $CH_3$ | 2.0 |
| VIII | F | $C{\equiv}CH$ | $C_2H_5$ | $C_2H_5$ | 10.0 |
| IX | | Atropine | | | 33.0 |

The novel compounds of the general Formula III can be produced in accordance with the invention by reacting benzophenone, or a benzophenone derivative substituted in the nucleus by a substituent of the group consisting of the halogen atoms and the methyl radical, with acetylene and an alkali metal in liquid ammonia to convert it into the corresponding ethinyl carbinol, condensing the latter with a tertiary halogenated base of the general formula

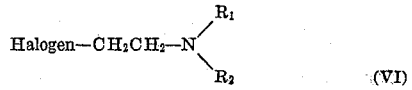

wherein $R_1$ and $R_2$ are alkyl radicals with 1–3 carbon atoms, in the presence of an alkaline substance, preferably sodamide, to form the basic ether, and converting the basic ether in the usual way into a salt, for example with a hydrogen halide into a salt of the hydrohalic acid or with an alkyl halide or alkyl ester into a quaternary ammonium salt.

For example, p-chloro-benzophenone (a) is condensed with sodium acetylene in liquid ammonia in accordance with the following Equation A to form the ethinyl carbinol (b) and the latter is reacted in a second stage in accordance with Equation B with a basic alkyl halide in the presence of sodamide to form the corresponding basic ether of the general Formula c (A)

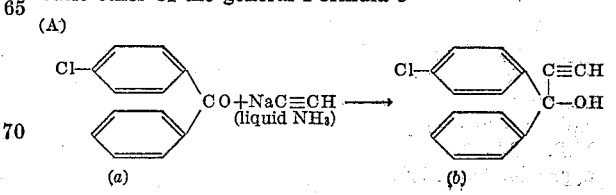

(B)

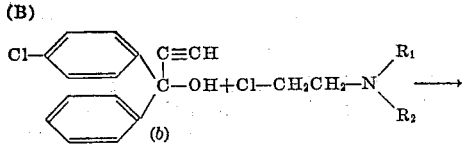

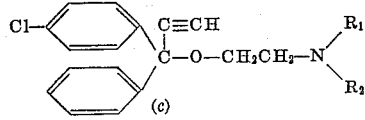

The base (c) thus obtained is then converted in the usual way with a hydrogen halide, for example hydrogen chloride, into a water-soluble salt of the hydrohalic acid, or by reaction with an alkyl halide or an alkyl ester into a quaternary ammonium salt.

The following examples further illustrate the invention.

*Example 1*

4-chloro-α-ethinyl-benzhydrol can be produced as follows: 1 litre of ammonia is placed in a 2-litre 3-tube flask having a stirrer mechanism, gas supply pipe and dropping funnel. The flask is cooled with a mixture of carbon dioxide and acetone. Acetylene is introduced into the ammonia. The acetylene is washed with mercuric chloride solution containing hydrochloric acid and potassium dichromate solution containing nitric acid and dried with calcium chloride and phosphorus pentoxide. During the introduction, 25.3 g. (1.1 mols) of sodium are introduced so slowly that the solution does not become blue in colour. After the sodium has been added, more acetylene is introduced for one hour and then a solution of 216.5 g. (1 mol) of 4-chloro-benzophenone in 800 cc. of ether (dried over sodium) is slowly added. After the introduction of the ether is complete, the cooling system is removed, the ammonia is allowed to evaporate overnight and the residue is then introduced into a mixture of ice and sulphuric acid. The mixture is submitted to extraction with ether, the ether is distilled off and the residue is fractionated in vacuo. B.P.$_{0.3 \text{ mm.}}$ 150–156° C., M.P. 50–52° C. (from ligroin). Yield: 200 g.=82%.

4-chloro-α-ethinyl-benzhydrol can be converted into β-dimethylamino-ethyl-(4-chloro-α-ethinyl-benzhydryl)-ether as follows:

121.3 g. (0.5 mol) of 4-chloroethinyl-benzhydrol are dissolved in 300 cc. of toluene in a 1-litre 3-tube flask equipped with a stirrer mechanism and reflux condenser, and mixed with 19.5 g. (0.5 mol) of sodamide. After 15 minutes, 54 g. (0.5 mol) of β-dimethylamino-ethyl chloride are added and the resulting mixture is heated for 2 hours to the boiling point. After cooling, the mixture is submitted to extraction by shaking three times with water and then with dilute hydrochloric acid. The hydrochloric acid extract is twice shaken with ether to remove unmodified carbinol, and is then made alkaline and submitted to extraction with ether. The ether extract is dried with sodium sulphate, the ether is removed and the residue is fractionated in vacuo. B.P.$_{0.2 \text{ mm.}}$ 150–155° C.; M.P. 52–55° C. (from petroleum ether). Yield: 86 g.=54%.

The hydrochloride is produced in ether by mixing the aforementioned base with ether containing hydrogen chloride. M.P. 150–152° C. (from ethylacetate).

N-dimethyl-N-ethyl-N-[-β-(4-chloro-α-ethinyl-benzhydroxy)-ethyl]-ammonium iodide is produced as follows:

15.7 g. (1/20 mol) of the aforementioned base, 8 g. (1/20 mol) of ethyl iodide and 50 cc. of ethylacetate are heated for 1 hour to the boiling point. After cooling, the mixture is treated with ether and the resulting precipitate is filtered off with suction and washed with ether. M.P. 134–138° C. (from acetone and ether). Yield approximately 70%.

The N-trimethyl-N-[β-(4-chloro-α-ethinyl-benzhydryloxy)-ethyl]-ammonium methosulphate is produced from 15.7 g. (1/20 mol) of the aforementioned base, 6.3 g. (1/20 mol) of dimethylsulphate and 50 cc. of ethyl acetate. M.P. 154–157° C. (crude substance). Yield approximately 60%.

*Example 2*

β-Diethylamino-ethyl-(4-chloro-α-ethinyl-benzhydryl)-ether can be produced from 121.3 g. (0.5 mol) of 4-chloro-α-ethinyl-benzhydrol, 300 cc. of toluene, 19.5 g. (0.5 mol) of sodamide and 68 g. (0.5 mol) of diethylamino-ethyl chloride by a method analogous to that described in Example 1. B.P.$_{0.15 \text{ mm.}}$ 157–160° C. $n_D^{23}$: 1.5520. Yield 108 g.=63%.

The hydrochloride is obtained in ether by mixing the aforementioned base with ether containing hydrogen chloride. M.P. 111–113° C. (from ethyl acetate).

The N-triethyl-N-[β-(4-chloro-α-ethinyl-benzhydryloxy)-ethyl]-ammonium iodide is produced from 17.1 g. (1/20 mol) of the aforementioned base, 8 g. (1/20 mol) of ethyl iodide and 50 cc. of ethyl acetate. The mixture is heated for 4 hours to the boiling point. M.P. 152–155° C. (from acetone and ether). Yield: approximately 75%.

The N-methyl-N-diethyl-N-[β-(4-chloro-α-ethinyl-benzhydryloxy)-ethyl]-ammonium methosulphate is produced from 17.1 g. (1/20 mol) of the base, 6.3 g. (1/20 mol) of dimethyl sulphate and 50 cc. of ethyl acetate. The mixture is heated for 1 hour at the boiling point. The substance was not obtained in a solid form.

*Example 3*

β-Pyrrolidino-ethyl-(4-chloro-α-ethinyl-benzhydryl)-ether is obtained from 121.3 g. (0.5 mol) of 4-chloro-α-ethinyl-benzhydrol, 300 cc. of toluene, 19.5 g. (0.5 mol) of sodamide and 67 g. (0.5 mol) of pyrrolidino-ethyl chloride. B.P.$_{0.75 \text{ mm.}}$ 175–184° C. Yield: 42 g.=24%.

The hydrochloride is obtained in ether by mixing the aforementioned base with ether containing hydrogen chloride. M.P. 113–116° C. (from acetone and ether).

What we claim is:

1. A compound selected from the group consisting of compounds of the following general formula:

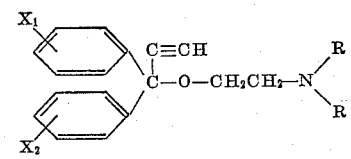

wherein R is an alkyl radical of 1–3 carbon atoms, and wherein $X_1$ and $X_2$ are each selected from the group consisting of hydroben, halogens and the methyl radical, hydrohalic acid salts thereof, and lower alkyl ester and lower alkyl halide quaternary ammonium salts thereof.

2. The compound β-di-methylamino-ethyl-(4-chloro-α-ethinyl-benzhydryl)-ether.

3. The hydrochloride acid addition salt of β-di-methylamino-ethyl-(4-chloro-α-ethinyl-benzhydryl)-ether.

4. The compound β-diethylamino-ethyl-(4-chloro-α-ethinyl-benzhydryl)-ether.

5. The compound N-methyl-N-diethyl-N-[β-(4-chloro-α-ethinyl-benzhydryloxy)-ethyl]-ammonium methosulphate.

6. The compound β-pyrrolidino-ethyl-(4-chloro-α-ethinyl-benzhydryl)-ether.

7. The hydrogen chloride acid addition salt of β-diethylamino-ethyl-(4-chloro-α-ethinyl-benzhydryl)-ether.

References Cited in the file of this patent

UNITED STATES PATENTS

| | | |
|---|---|---|
| 2,527,963 | Rieveschl | Oct. 31, 1950 |
| 2,584,429 | Croxall et al. | Feb. 5, 1952 |